(12) United States Patent
Robertson et al.

(10) Patent No.: US 8,452,190 B1
(45) Date of Patent: May 28, 2013

(54) WAVELENGTH LOCKED CHANNEL SELECT

(75) Inventors: Stephen Robertson, Harleysville, PA (US); Thomas W. Karras, Berwyn, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 336 days.

(21) Appl. No.: 12/884,382

(22) Filed: Sep. 17, 2010

(51) Int. Cl.
H04B 10/04 (2006.01)
H04J 14/02 (2006.01)

(52) U.S. Cl.
USPC ............... 398/201; 398/79; 398/85; 398/183

(58) Field of Classification Search
USPC ............ 398/79, 85, 158, 163, 183–185, 192, 398/201
See application file for complete search history.

(56) References Cited

U.S. PATENT DOCUMENTS

| | | | |
|---|---|---|---|
| 6,816,296 B2 * | 11/2004 | Romanovsky | 359/245 |
| 7,092,591 B2 | 8/2006 | Savchenkov et al. | |
| 7,283,707 B1 | 10/2007 | Maleki et al. | |
| 7,460,746 B2 * | 12/2008 | Maleki et al. | 385/27 |
| 7,587,144 B2 | 9/2009 | Ilchenko et al. | |
| 2011/0110387 A1 * | 5/2011 | Maleki et al. | 372/20 |
| 2012/0194893 A1 * | 8/2012 | Maleki et al. | 359/246 |

* cited by examiner

*Primary Examiner* — Dalzid Singh
(74) *Attorney, Agent, or Firm* — Fraser Clemens Martin & Miller LLC; J. Douglas Miller

(57) ABSTRACT

A signal processing system includes an input for receiving an input signal, a light source for generating an optical carrier signal having a pre-determined wavelength, a modulator for receiving the input signal and the optical carrier signal and modulating the optical carrier signal based upon the input signal, and an optical filter having a plurality of signal channels, wherein at least one of the signal channels is locked by a reinsertion of the optical carrier signal to pass signals having a wavelength substantially the same as the wavelength of the optical carrier signal.

20 Claims, 1 Drawing Sheet

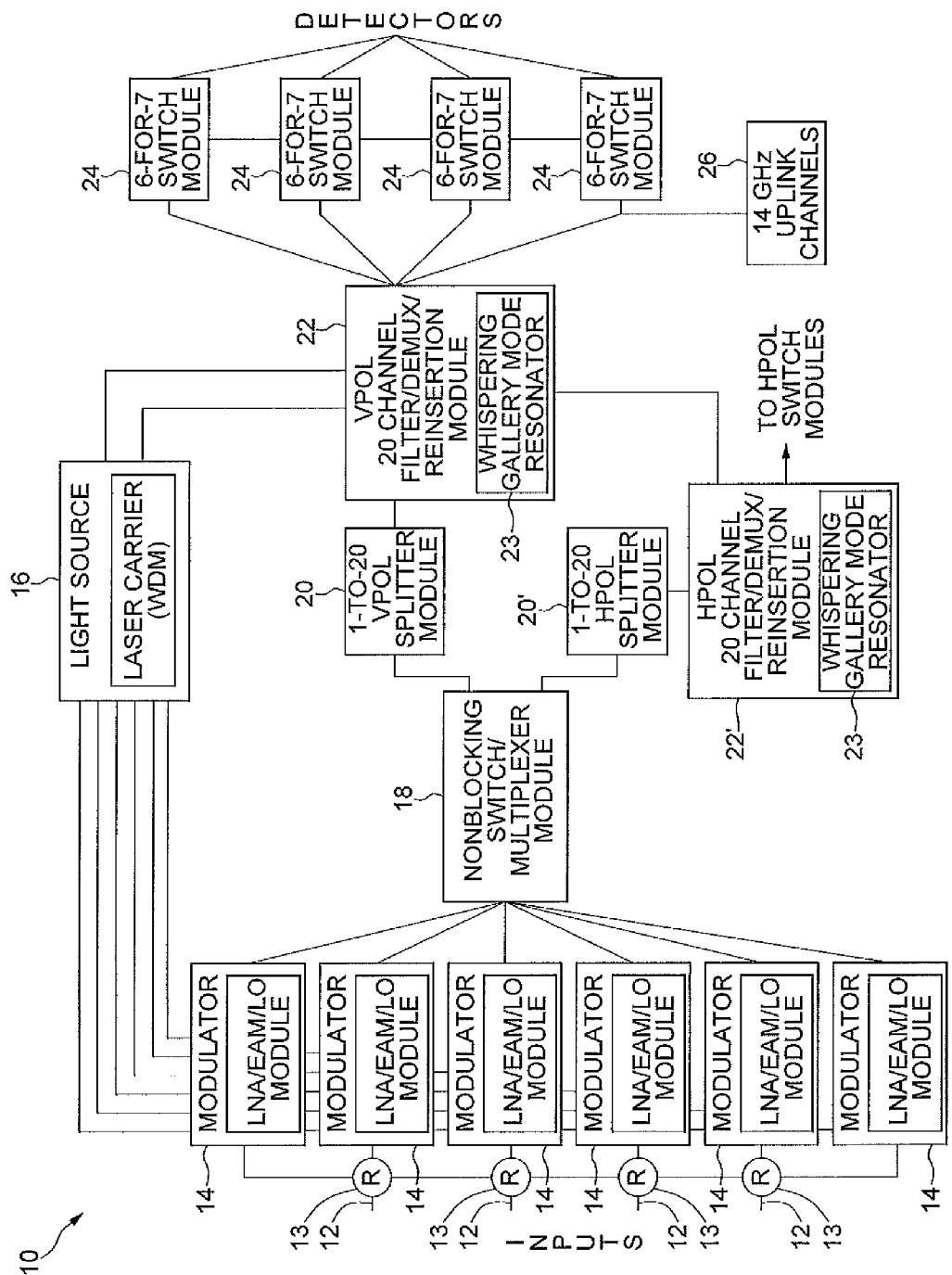

WAVELENGTH LOCKED CHANNEL SELECT

STATEMENT REGARDING FEDERALLY SPONSORED RESEARCH OR DEVELOPMENT

Not applicable.

FIELD OF THE INVENTION

The invention relates to signal processing and filtering, and in particular, to wavelength locking between an optical source and various resonant elements used to construct an optical filter.

BACKGROUND OF THE INVENTION

Various applications require filtering of multiple combined spectral components in signals by selecting one or more of the spectral components while rejecting the other components. One example is band pass filtering where a selected one or more spectral components within a spectral pass band are selected to transmit and spectral components outside the spectral band are rejected. A filter may be tunable, e.g., under a control of a tuning control signal, to change the frequency range of the filtered signal.

Multi-channel radio frequency (RF) switching currently requires large arrays of switches. Such switch arrays are heavy, large, complex, and costly. In space applications, RF switch arrays cannot be reprogrammed easily from the ground, resulting in the use of multiple arrays to provide on-orbit channel agility. For example, the uplink beam switch and channel filter network deployed in a conventional payload are forced to use two large switch arrays in order to provide uplink beam selection prior to channel filtering.

Optical band pass filters are known where optical spectral components within a spectral window transmit through the filter while other spectral components outside the spectral window are rejected. It is known to construct optical band pass filters using optical resonators, which are small electro-optical devices, having diameters on the order of millimeters, formed of curved optical waveguides, for example, a cylinder, a sphere, or a toroid within which light is internally reflected at the inner surface of the optical resonator. Some optical resonators can support resonator modes of light called whispering gallery modes, and thus, are often referred to as whispering gallery mode resonators. Whispering gallery modes occur when light having an evanescent wave component travels via internal reflection around the periphery of the optical resonator. The whispering gallery modes of optical resonators reside close to the surface of the optical resonator, and undergo total internal reflection. The evanescent wave component extends beyond the optical resonator's outer surface and may be coupled into an adjacent optical coupler as long as the optical coupler is located within the extent of the evanescent wave, typically on the order of the light's wavelength.

Many optical resonators which propagate whispering gallery modes of light have extremely low transmission losses, and as a result, have a very high quality factor Q. High Q optical resonators are desirable because the higher the Q, the longer the amount of time the internally reflected light will remain within the optical resonator.

Optical domain filters are able to filter any desired signal including RF, microwave, millimeter, Gigahertz or Terahertz frequency that is modulated as a sideband on an optical carrier. The use of whispering gallery mode resonator technology allows for designing optical domain filters with features of small size and weight, suitable for ground as well as spacecraft applications.

It is desirable to develop a system and method for wavelength locking between the optical source and the optical resonators used to construct an optical filter, wherein a conversion of received signals to an optical domain allows each channel of the filter to select between multiple uplink beams without the need for external RF switch arrays, thereby reducing a size and a weight of the channel filter banks.

SUMMARY OF THE INVENTION

Concordant and consistent with the present invention, a system and method for wavelength locking between the optical source and the optical resonators used to construct an optical filter, wherein a conversion of received signals to an optical domain allows each channel of the filter to select between multiple uplink beams without the need for external RF switch arrays, thereby reducing a size and a weight of the channel filter banks, has been discovered.

In one embodiment, a signal processing system comprises: an input for receiving an input signal; a light source for generating an optical carrier signal having a pre-determined wavelength; a modulator for receiving the input signal and the optical carrier signal and modulating the optical carrier signal based upon the input signal; and an optical filter having a plurality of signal channels, wherein at least one of the signal channels is locked by a reinsertion of the optical carrier signal to pass signals having a wavelength substantially the same as the wavelength of the optical carrier signal.

In another embodiment, a signal processing system compromises: at least one input for receiving a plurality of input signals; a source for generating a plurality of optical carrier signals, each carrier signal having a pre-determined wavelength; a first modulator for receiving a first one of the optical carrier signals and modulating the first one of the optical carrier signals based upon one of the input signals to generate a first modulated signal; a second modulator for receiving a second one of the optical carrier signals and modulating the second one of the optical carrier signals based upon one of the input signals to generate a second modulated signal; and an optical filter having a plurality of signal channels, wherein at least one of the signal channels is locked by a reinsertion of the first optical carrier signal to pass the first modulated signal having a wavelength substantially the same as the wavelength of the first optical carrier signal, and wherein at least one of the signal channels of the optical filter is locked by a reinsertion of the second optical carrier signal to pass the second modulated signal having a wavelength substantially the same as the wavelength of the second optical carrier signal.

The invention also provides methods for filtering signals.

One method comprises the steps of: receiving a first input signal; generating a first optical carrier signal having a first pre-determined wavelength; modulating the first carrier signal based upon the first input signal to generate a first modulated signal; providing an optical filter having a plurality of signal channels; and locking at least one of the signal channels to the wavelength of the optical carrier signal to pass signals having a wavelength substantially similar to the wavelength of the first carrier signal.

DRAWINGS

The above, as well as other advantages of the present invention, will become readily apparent to those skilled in the art from the following detailed description of the preferred embodiment when considered in the light of the accompanying drawing, which is a schematic representation of a signal processing system according to an embodiment of the present invention.

DETAILED DESCRIPTION OF THE INVENTION

The following detailed description and appended drawing describe and illustrate various embodiments of the invention. The description and drawing serve to enable one skilled in the art to make and use the invention, and are not intended to limit the scope of the invention in any manner.

Referring to the drawing, there is illustrated a signal processing system 10 according to an embodiment of the present invention. It is understood that the system 10 can be configured as a payload for a space application. As shown, the system 10 includes a plurality of inputs 12 (e.g. waveguides) for receiving electromagnetic radiation (e.g. RF signals, millimeter wave signals, etc.) at a pre-determined frequency (e.g. 17 GHz). As a non-limiting example, each of the inputs 12 can include a polarized waveguide (not shown) for horizontal and/or vertical polarization. It is understood that the inputs 12 can be configured to receive signals having various frequencies. It is further understood that other polarization techniques can be used. As a further non-limiting example, each of the inputs 12 includes a redundancy switch 13.

Each of the inputs 12 is in signal communication with at least one of a plurality of modulators 14 (e.g. photonic or optical). As a non-limiting example, each of the modulators 14 includes a low noise amplifier (LNA). As a further non-limiting example, the modulators 14 include at least one of an electro-absorption modulator (EAM) and a local oscillator (LO).

A light source 16 (e.g. laser) is in communication with each of the modulators 14 to selectively apply an optical (laser) carrier having a pre-determined wavelength to each of the modulators 14 in a manner similar to wavelength-division multiplexing (WDM). As a non-limiting example, each of a plurality of optical carriers is modulated based at least one of the signals received by the inputs 12 and using a known frequency translation technique, such as with the electro-absorption modulator. As a further non-limiting example, each of the modulators 14 is supplied with an optical carrier having a different wavelength (color) of laser light. Accordingly, each of the signals received by the inputs 12 can be carried by one of the optical carriers having a distinct wavelength for subsequent locking and filtering.

Each of the modulators 14 transmits a modulated output signal including one of the optical carriers to a multiplexer module 18 (e.g. 8×8 switch manufactured by Polatis Inc., switch/combiner manufactured by Sandia Corp.) The multiplexer module 18 combines the multiple optical carrier signals from the modulators 14 into one of a pair of multiplexed signals (e.g. separated by horizontal polarization and vertical polarization), wherein each of the multiplexed signals is transmitted to one of a pair of signal splitters 20, 20' (e.g. conventional 1×32 splitter or integrated circuit). As a non-limiting example, the signal splitters 20, 20' are configured to split the multiplexed signals and transmit a plurality of split signals through each of the fibers (e.g. twenty fibers) of an optical ribbon. It is understood that each of the split signals includes all of the information represented by each of the multiplexed signals received by a respective one of the signal splitters 20, 20'.

Each of a pair of channel filters 22, 22' (e.g. optical) is in communication with one of the signal splitters 20, 20' to receive the split signals through each of the fibers of the optical ribbon. Each of the channel filters 22, 22' is also in communication with the light source 16 to receive each of the optical carriers having pre-determined wavelengths (i.e. reinsertion of the optical carrier). Therefore, each channel of each of the channel filters 22, 22' can be locked to a particular wavelength of one of the optical carriers in order to filter the respective channel and block information carried by an optical carrier having a different wavelength, similar to the locking technique disclosed in co-owned U.S. patent application Ser. No. 12/784,076, hereby incorporated herein by reference in its entirety.

In certain embodiments, each of the fibers of the optical ribbon is passing all of the information represented by each of the multiplexed signals received by a respective one of the signal splitters 20, 20' and each of the channels of a respective one of the channel filters 22, 22' receives all of the information. Accordingly, any of the channels of the respective one of the channel filters 22, 22' can be tuned and locked to any one of the optical carriers in order to extract a particular portion of the total information received at the inputs 12.

As a non-limiting example, each of the channel filters 22, 22' includes at least one whispering gallery mode resonator (WGMR) 23 configured sufficiently narrowly to pass only a spectral component of the split signals for transmission through the respective one of the channel filters 22, 22', as a filtered signal. As a further non-limiting example, the WGMRs 23 are configured/excited based upon at least one of the optical carriers generated by the light source 16. Specifically, a free spectral range (FSR) of each of the WGMRs 23 are configured to be wavelength locked to a plurality of source lasers (e.g. optical carriers). If each of the optical carriers includes a signal information for a different input 12, then the action of locking one of the channels of one of the channel filters 22, 22' (by locking the WGMR 23) to a respective one of the optical carriers serves the same function as an conventional RF input switch, but in a greatly simplified manner. Each channel of each of the channel filters 22, 22' can be tuned and locked to pass a selected portion of the information received at the inputs 12.

The filtered signals are passed through the channel filters 22, 22' and demultiplexed for distribution to at least one of a plurality of switch modules 24 (e.g. 8×8 switch manufactured by Polatis Inc., switch/combiner manufactured by Sandia Corp.). Each of the switch modules 24 can include an amplifier (not shown) and a redundancy component (not shown). At least one of the switch modules 24 can receive an uplink signal from another source of input signals 26 similar to that which was described above (e.g. 14 Ghz RF signals from different input source). Each of the switch modules 24 can output a clean signal available for further processing by detectors, amplifiers (e.g. linearized driver amplifier with level control (LDALC), and other signal processing components.

Conversion of signals to the optical domain allows each of the channel filters 22, 22' to select between multiple uplink beams without the need for external RF switch arrays. Accordingly, the present invention eliminates the requirement to include conventional switch arrays in selecting which signals to process and reduces a size and a weight of the overall system. The optical channel filters 22, 22' including whispering gallery mode resonators (WGMRs) 23 are more than an order of magnitude smaller than a conventional RF counterpart, while offering performance advantages such as low loss and tunability. When an RF input signal contains multiple communication channels, an array of WGMR-based channel filters 22, 22' can replace an entire array of conventional RF switches and filters. Therefore, the same funcationality can be realized in an application space that is smaller than the conventional RF filter array and without the need for the RF switch array.

While certain representative embodiments and details have been shown for purposes of illustrating the invention, it will be apparent to those skilled in the art that various changes may be made without departing from the scope of the disclosure, which is further described in the following appended claims.

What is claimed is:

1. A signal processing system, comprising:
   a plurality of inputs for receiving a plurality of input signals;
   a light source for generating a plurality of optical carrier signals, each carrier signal having a pre-determined wavelength;
   a plurality of modulators, each modulator for receiving one of the input signals and one of the optical carrier signals and modulating the optical carrier signal based upon the one of the input signals; and
   an optical filter having a plurality of signal channels, wherein at least one of the signal channels is locked by a reinsertion of one of the optical carrier signals to pass a modulated signal having a wavelength substantially the same as the wavelength of the optical carrier signal.

2. The system according to claim 1, wherein the input is a waveguide.

3. The system according to claim 1, wherein the input is a polarized waveguide.

4. The system according to claim 1, wherein the input signal has a frequency in the radio spectrum.

5. The system according to claim 1, wherein the source for generating the optical carrier signal is a laser.

6. The system according to claim 1, wherein the modulator includes at least one of an electro-absorption modulator and a local oscillator for modulating the optical carrier signal.

7. The system according to claim 1, wherein the optical filter includes a whispering gallery mode resonator that is excited by the optical carrier signal to lock the at least one of the signal channels of the optical filter to the wavelength of the optical carrier signal.

8. The system of claim 1, wherein another of the signal channels is locked by a reinsertion of another of the optical carrier signals to pass another modulated signal having a wavelength substantially the same as the wavelength of the another of the optical carrier signals.

9. A signal processing system, comprising:
   at least one input for receiving a plurality of input signals;
   a light source for generating a plurality of optical carrier signals, each carrier signal having a pre-determined wavelength;
   a first modulator for receiving a first one of the optical carrier signals and modulating the first one of the optical carrier signals based upon one of the input signals to generate a first modulated signal;
   a second modulator for receiving a second one of the optical carrier signals and modulating the second one of the optical carrier signals based upon one of the input signals to generate a second modulated signal; and
   an optical filter having a plurality of signal channels, wherein at least one of the signal channels is locked by a reinsertion of the first optical carrier signal to pass the first modulated signal having a wavelength substantially the same as the wavelength of the first optical carrier signal, and wherein at least one of the signal channels of the optical filter is locked by a reinsertion of the second optical carrier signal to pass the second modulated signal having a wavelength substantially the same as the wavelength of the second optical carrier signal.

10. The system according to claim 9, wherein the at least one input is a waveguide.

11. The system according to claim 9, wherein the input signals each have a frequency in the radio spectrum.

12. The system according to claim 9, wherein the wavelength of the first one of the carrier signals is different from the wavelength of the second one of the carrier signals.

13. The system according to claim 9, wherein at least one of the modulators includes at least one of an electro-absorption modulator and a local oscillator for modulating at least one of the carrier signals.

14. The system according to claim 9, wherein the optical filter includes a whispering gallery mode resonator that is excited by at least one of the optical carrier signals to lock the at least one of the signal channels of the optical filter to the wavelength of the at least one of the optical carrier signals.

15. The system according to claim 9, further comprising a multiplexer in signal communication with each of the first modulator and the second modulator to combine the first modulated signal with the second modulated signal to generate a multiplexed signal.

16. The system according to claim 15, further comprising a signal splitter in signal communication with the multiplexer to split the multiplexed signal into a plurality of split signals, wherein each of the split signals represents identical information.

17. The system according to claim 15, wherein each of the signal channels of the channel filter receives one of the split signals.

18. A method for filtering signals, the method comprising the steps of:
   receiving a first input signal;
   generating a first optical carrier signal having a first pre-determined wavelength;
   modulating the first carrier signal based upon the first input signal to generate a first modulated signal;
   providing an optical filter having a plurality of signal channels;
   locking at least one of the signal channels to the wavelength of the optical carrier signal to pass signals having a wavelength substantially similar to the wavelength of the first carrier signal;
   receiving a second input signal;
   generating a second optical carrier signal having a second pre-determined wavelength;
   modulating the second carrier signal based upon the second input signal to generate a second modulated signal; and
   locking at least one of the signal channels of the optical filter to the second pre-determined wavelength of the second optical carrier signal to pass signals having a wavelength substantially similar to the second pre-determined wavelength of the second carrier signal.

19. The method according to claim 18, wherein the optical filter includes a whispering gallery mode resonator that is excited by at least one of the first optical carrier signal to lock the at least one of the signal channels of the optical filter to a wavelength of the first optical carrier signal.

20. The method according to claim 18, wherein the wavelength of the first carrier signal is different from the wavelength of the second carrier signal.

* * * * *